(12) United States Patent
Narayan et al.

(10) Patent No.: US 6,629,279 B1
(45) Date of Patent: Sep. 30, 2003

(54) METHOD AND SYSTEM FOR TESTING THE PERFORMANCE OF DSP

(75) Inventors: Suman Narayan, Richardson, TX (US); Tandhoni S. Rao, Ashland, MA (US)

(73) Assignee: Texas Instruments Incorporated, Dallas, TX (US)

(*) Notice: Subject to any disclaimer, the term of this patent is extended or adjusted under 35 U.S.C. 154(b) by 521 days.

(21) Appl. No.: 09/594,866

(22) Filed: Jun. 15, 2000

Related U.S. Application Data

(60) Provisional application No. 60/144,868, filed on Jul. 20, 1999.

(51) Int. Cl.[7] ............................................... G01R 31/28
(52) U.S. Cl. ....................................................... 714/732
(58) Field of Search ........................................ 714/732

(56) References Cited

U.S. PATENT DOCUMENTS

| | | | | |
|---|---|---|---|---|
| 4,897,842 A | * | 1/1990 | Herz et al. ................... | 714/732 |
| 4,924,469 A | * | 5/1990 | Tamaru et al. ............... | 714/732 |
| 5,157,782 A | * | 10/1992 | Tuttle et al. ................... | 714/45 |
| 5,488,615 A | * | 1/1996 | Kunoff et al. ............... | 714/732 |
| 5,515,384 A | * | 5/1996 | Horton, III ................... | 714/732 |
| 5,638,382 A | * | 6/1997 | Krick et al. .................. | 714/733 |
| 5,668,947 A | * | 9/1997 | Batcher ........................ | 714/30 |
| 5,978,946 A | * | 11/1999 | Needham ..................... | 714/732 |
| 6,003,142 A | * | 12/1999 | Mori ............................ | 714/30 |
| 6,367,029 B1 | * | 4/2002 | Mayhead et al. ............... | 714/2 |
| 6,415,394 B1 | * | 7/2002 | Fruehling et al. ............. | 714/30 |

* cited by examiner

*Primary Examiner*—Albert Decady
*Assistant Examiner*—Joseph D. Torres
(74) *Attorney, Agent, or Firm*—Robert L. Troike; Frederick J. Telecky, Jr.

(57) ABSTRACT

A method of testing the performance of real time DSP algorithms after customer code has been added and includes the steps of embedding a signature equation in the DSP code that calculates to a given signature value at the output of the DSP when running a test mode program through the DSP.

6 Claims, 2 Drawing Sheets

METHOD AND SYSTEM FOR TESTING THE PERFORMANCE OF DSP

This application claims priority under 35 USC §119(e)(1) of provisional application Ser. No. 60/144,868, filed Jul. 20, 1999.

FIELD OF INVENTION

This invention relates to Digital Signal Processors (DSP), and more particularly to testing of the performance of real time DSP algorithms.

BACKGROUND OF INVENTION

DSPs are used in many applications including use in modems, cellular phones, motor controls, and toys.

Subtle interactions between customer (known as peripheral) code and DSP algorithms can cause the digital output signal to deviate from the desired signals leading to performance degradation, customer returns, etc.

Multiple tests are needed to check if the digital signal has been corrupted. These tests require significant effort to establish and are time consuming. Some of these tests have to be done "offline" by taking the DSP out of it's application.

SUMMARY OF INVENTION

In accordance with one embodiment of the present invention, a digital signature equation is embedded in a processor code and when the processor is operated real time, the resultant signature output is used to verify if the processor has been corrupted.

IN THE DRAWINGS

DESCRIPTION OF THE PREFERRED EMBODIMENTS OF THE PRESENT INVENTION

Figure 1:
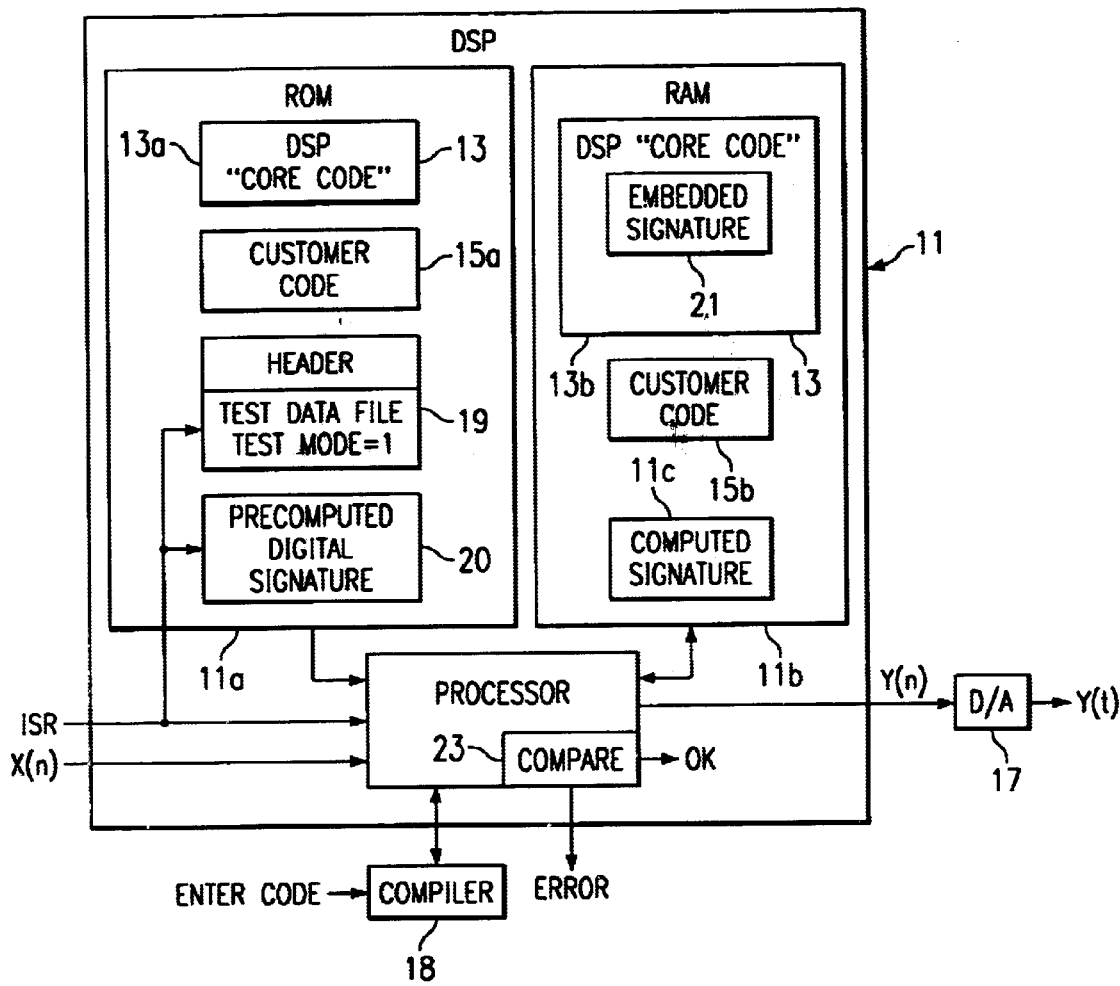
FIG. 1 illustrates a DSP system with a digital signature according to one embodiment of the present invention.

Referring to FIG. 1, the digital input signal X (n) is applied to the DSP 11 including the DSP "core" code 13 and the customer code (periphery code) 15. The digital output Y (n) signal is applied to a digital to analog D/A converter 17 to provide analog output Y (t). The DSP includes a Read Only Memory (ROM) 11a and Random Access Memory (RAM) 11b. The DSP is provided to a customer with the DSP "core" code 13. Some of the core code 13a is stored in the ROM and some of the "core" variables 13b are stored in the RAM which could be written over by the customer. The customer adds his or her code (customer code)and compiles the code with compiler 18 into machine language to operate on the DSP. The user then determines if there are any bugs in the program and, if so, does any correction. The customer would then store some code in the ROM 11a at 15a and the variables in RAM 11b at 15b. The customer may write over part of the "core" variables in the section 13b of RAM 11b causing the system to fail. Further, the processor capability in Machine Instructions Per Second (MIPS) may be exceeded by the customer application added. These interactions between the customer code and the core code in a DSP are tested by the present invention.

In accordance with one embodiment of the present invention, a header and a test file such as "Test Mode=1" is created and stored in section 19 of ROM 11a. The test file can be a few segments of sampled and digitized and encoded speech. This header would have a value that is pre-calculated using, for example, a digital signature equation ds=(ds)XOR (D/A). The initial value is any non zero value. The new value for the example would be the previous value exclusive ORed (XOR) with the current value. There is required one RAM 11b location 21 to store the digital signature equation. It would also require one instruction cycle to execute the XOR. The correct digital signature value would be pre-computed and stored in one location 20 of ROM 11a for the test file to compare against.

In the operation of the system there is an Interrupt Service Routine (IRS) every 8K samples and the output is read out to the D/A converter 17. When in the test mode, for example, (Test Mode=1) during the interrupt the calculation of the digital signature value takes place using the embedded signature equation 21 over the test file period and the resultant signature value is stored in the RAM location 11c. This digital signature value is compared in comparator 23 with that pre-computed and stored in location 20 of the ROM 11a. If they match, the added customer code is OK and has not corrupted the RAM "core" variables in the DSP. This is also checking if DSP runs out of real time (MPS) because if the system runs out of MIPS before the signature is completed in the e.g. 8 Khz, the system is going to drop digital samples.

Figure 2:
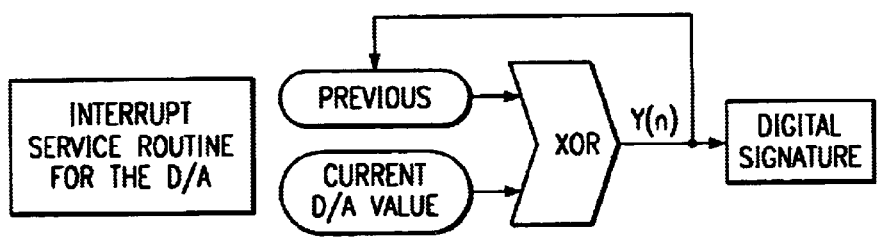
FIG. 2 illustrates a simple signature embedded in the code using a basic XOR gate (instruction according to one embodiment of the present invention)
Figure 3:
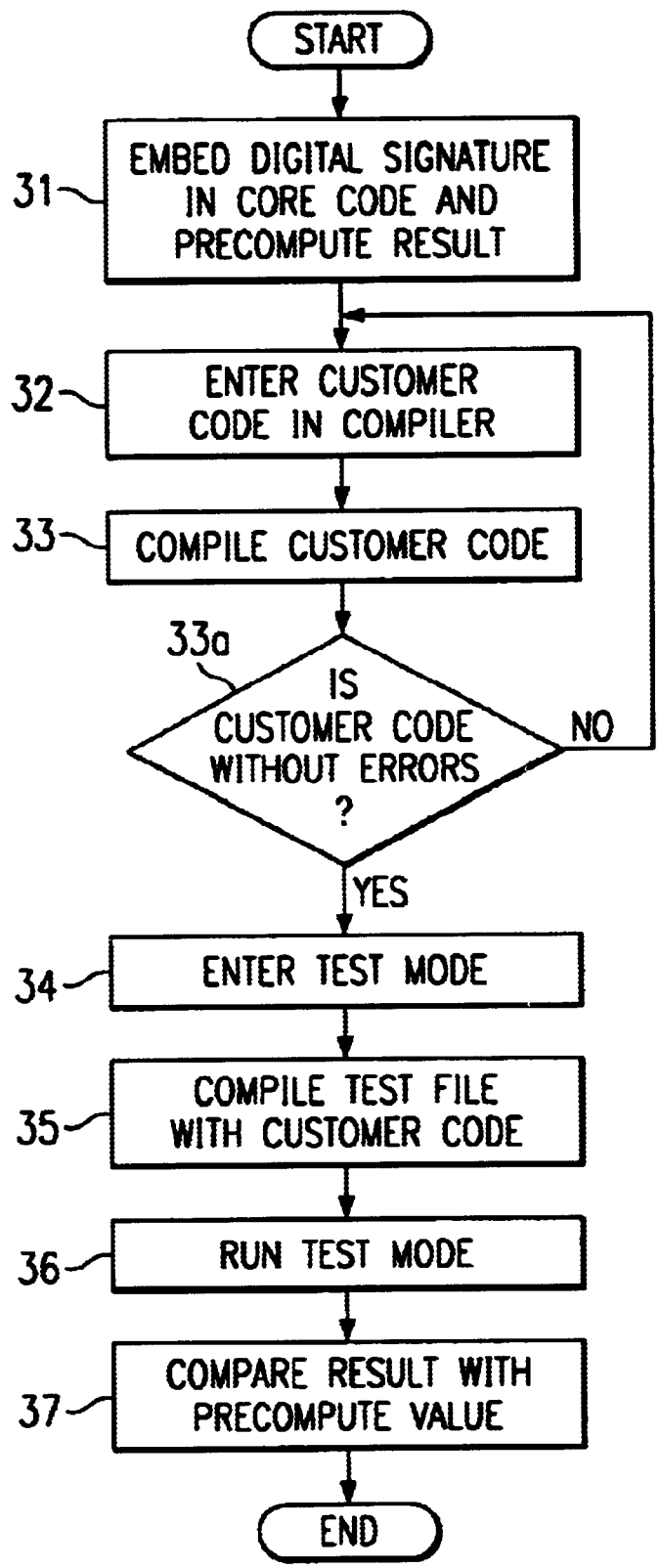
FIG. 3 is a flow chart of the test method.

In accordance with the method of operation of the present invention as illustrated in FIG. 3, the digital signature is embedded in the code and is pre-computed as in Step 31. The customer would develop the customer code and then compile it (Steps 32 and 33). If all is OK (Step 33a) it means that there are no errors in the code itself. The next Step 34 is to set the test mode by selecting "Test Mode=1." The test program and the customers code are then compiled in Step 35. The small test file (for example, a small speech encoded file) is run (Step 36). Any DSP algorithm may be used that generates data. The signature value is then computed when the test program is run to get the signature at 11c and that signature value is compared with that pre-computed in the ROM 11a at location 20 (Step 37). If they match all is OK. If not, there is a problem with the customers code. For a simple example, using the ds=(ds) XOR (D/A) equation, if the test value comes out to be 1,2,3 and then 4 in sequence as the program runs through the equation four times before the final digital signature is calculated, the digital signature should be five to be correct. This simple example signature is embedded in the code using the logic XOR gate instruction as illustrated in FIG. 2. This code requires one RAM location to store "ds" (Digital Signature) and one instruction cycle to execute the XOR (depends on the processor clock cycle) and on ROM value to store the pre-computed correct digital signature for the test result to compare against.

Initial value of ds (digital signature) is any non-zero value:

ds=ds XOR D/A value.

The above instruction is executed in the interrupt service routine (every sample period for the D/A converter). If the test data file produces the numbered sequence of 1, 2, 3, and 4 then after a the instruction cycle the answer is 5 and that matches the signature then OK. If it does not reach 5, then not OK and there is an error. The initial value is not equal to zero. For the simple example above, for value 1 then ds=1XOR1(value of file in data file)=0. The next ds=0XOR 2=2, the next is 2XOR3=1, and then the next ds=1XOR4=5.

In actual practice, the Test Mode file may provide 8K samples of speech over a one second period to the signature equation in RAM section 21 and the output signature is a 16 bit value between −32768 (−8000 in HEX) and +32767 (+7FFF in HEX).

Variants of the above algorithm are possible. We could use an ADD instead of an XOR but this would lead to additional lines of code to verify saturation and more instruction cycles to execute the OR. We need not do a WORD by WORD XOR. We could use a BYTE (MSB or LSB only) and still obtain a digital signature. Other logical operators such as NAND, OR, AND, NOR can be used instead of the XOR or in addition to XOR to perform the same function. The input test file should not be a DC input.

Those skilled in the art will recognize that other variations are also possible without departing from the scope claimed below.

What is claimed is:

1. A method of testing performance of real time processor algorithms in a digital signal processor (DSP) comprising the steps of:

embedding a signature equation in code in said DSP to calculate to a given signature value when running a test program correctly through the DSP; and running said test program through said DSP that should calculate to said given signature value.

2. The method of claim 1, wherein said signature equation is embedded in a RAM of the DSP including core DSP code and customer code is added to the RAM of the DSP.

3. The method of claim 2, including the steps of storing a pre-computed signature value and comparing said pre-computed signature value with said given signature value out of said DSP to determine an error.

4. The method of claim 2, wherein after said embedding step compiling said DSP code with said embedded signature and said customer code before running said test program.

5. The method of claim 1, wherein said test program includes a segment of speech.

6. A method of determining interference with core DSP code operating a DSP in a RAM memory when adding customer code to said RAM memory for a particular application comprising the steps of:

embedding a signature equation in the core DSP code to calculate to a given signature value when running a test file program correctly through the DSP;

entering customer code and compiling customer code into said DSP;

providing a test file program which if runs correctly through said DSP provides a given stored signature value;

compiling said customer code with said test file program;

running said test file program through said DSP; and calculating the value of the output of the DSP over the test time period of the test program to determine if the output is of said given signature value to determine interference with the core DSP code.

* * * * *